July 12, 1966 R. R. WALTON 3,260,778
TREATMENT OF MATERIALS
Filed Jan. 23, 1964 6 Sheets-Sheet 2

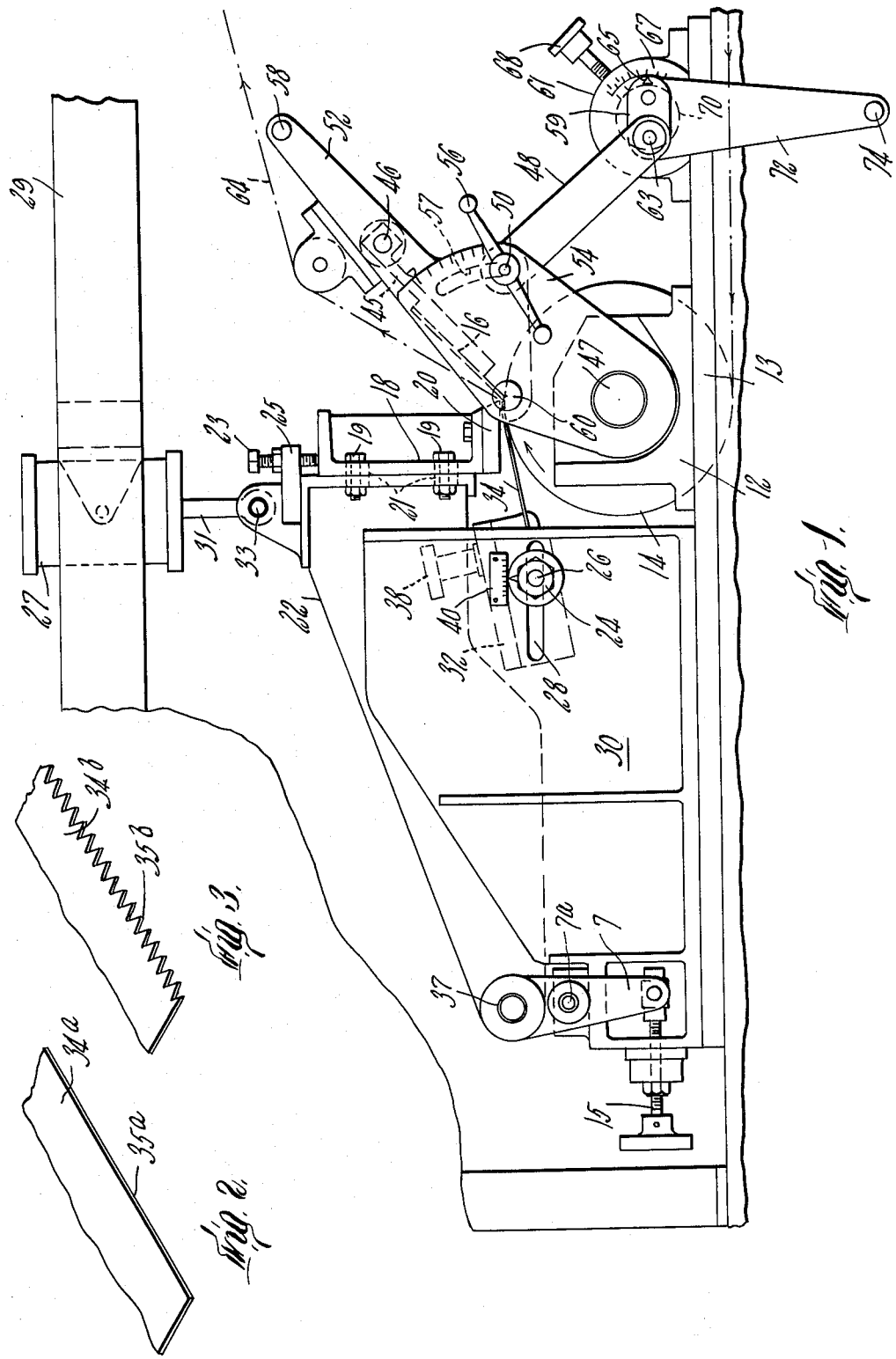

July 12, 1966  R. R. WALTON  3,260,778
TREATMENT OF MATERIALS
Filed Jan. 23, 1964  6 Sheets-Sheet 3
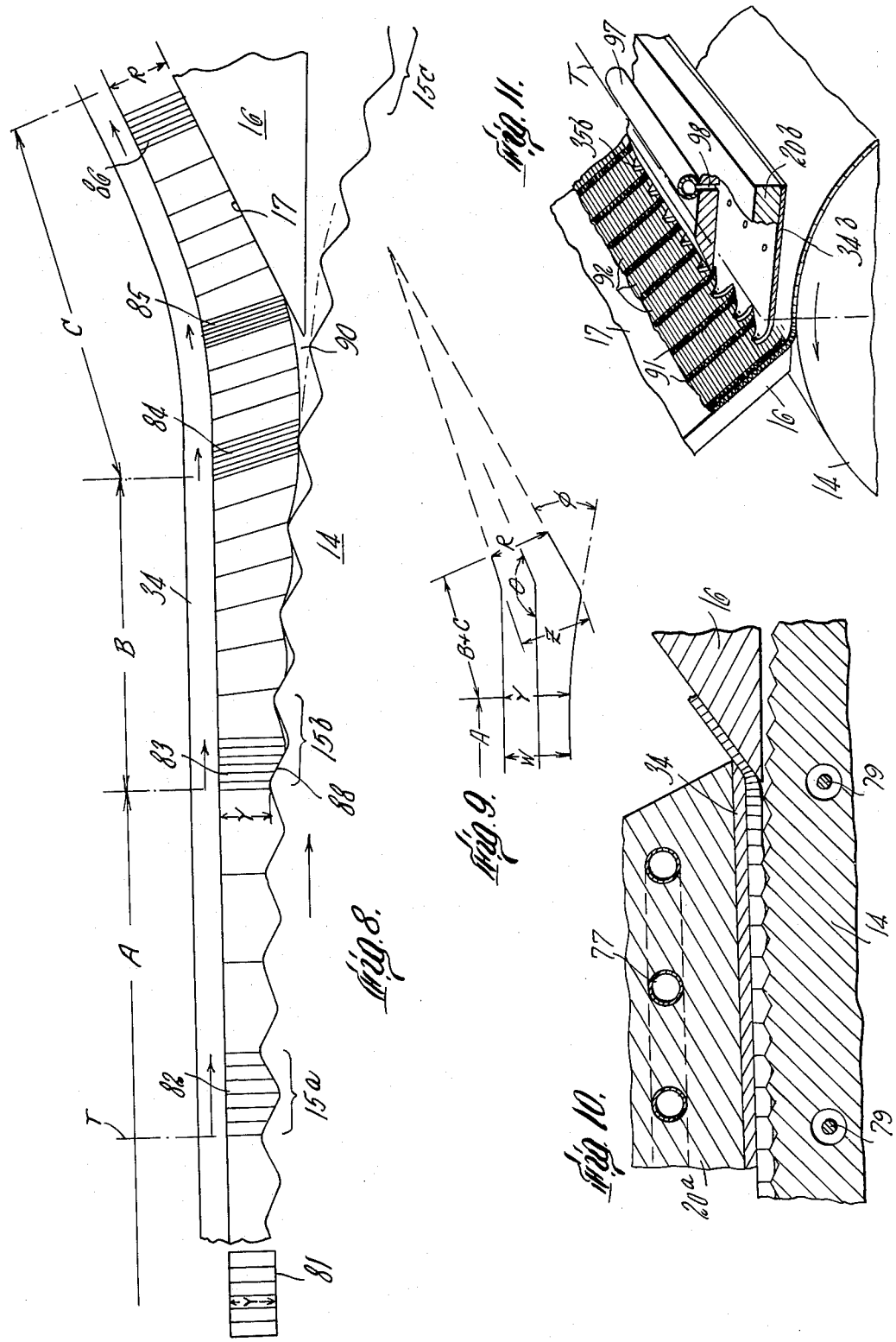

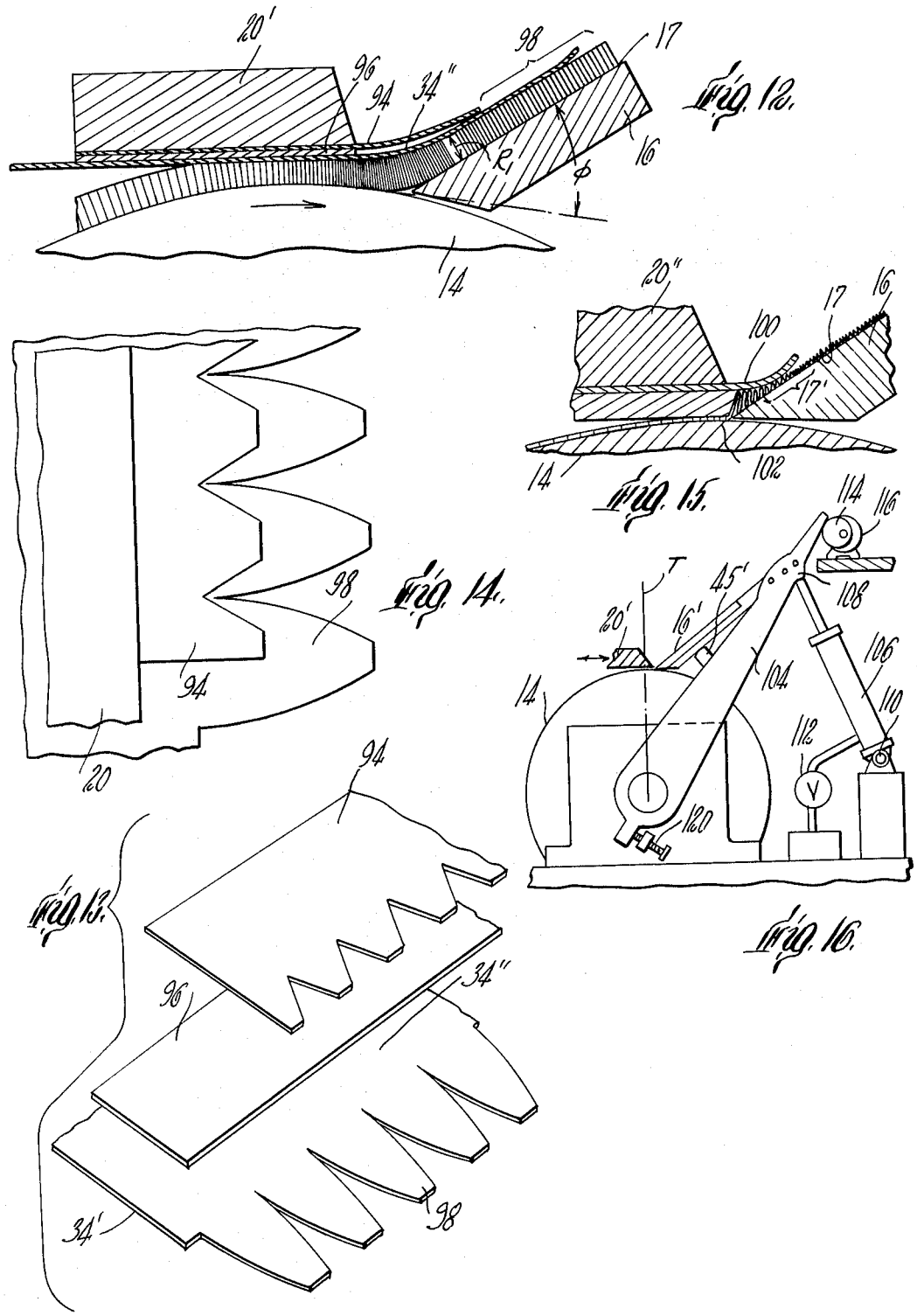

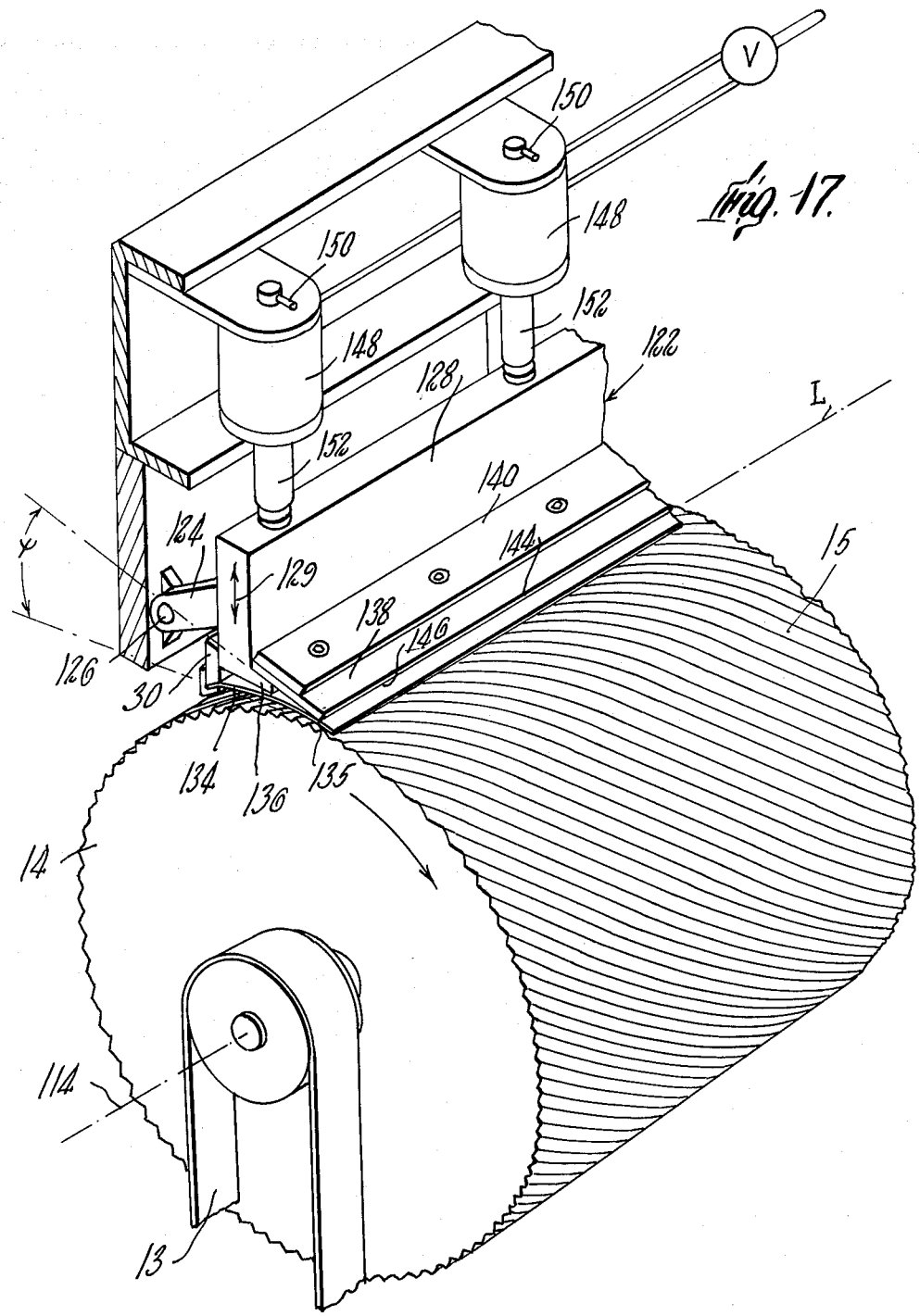

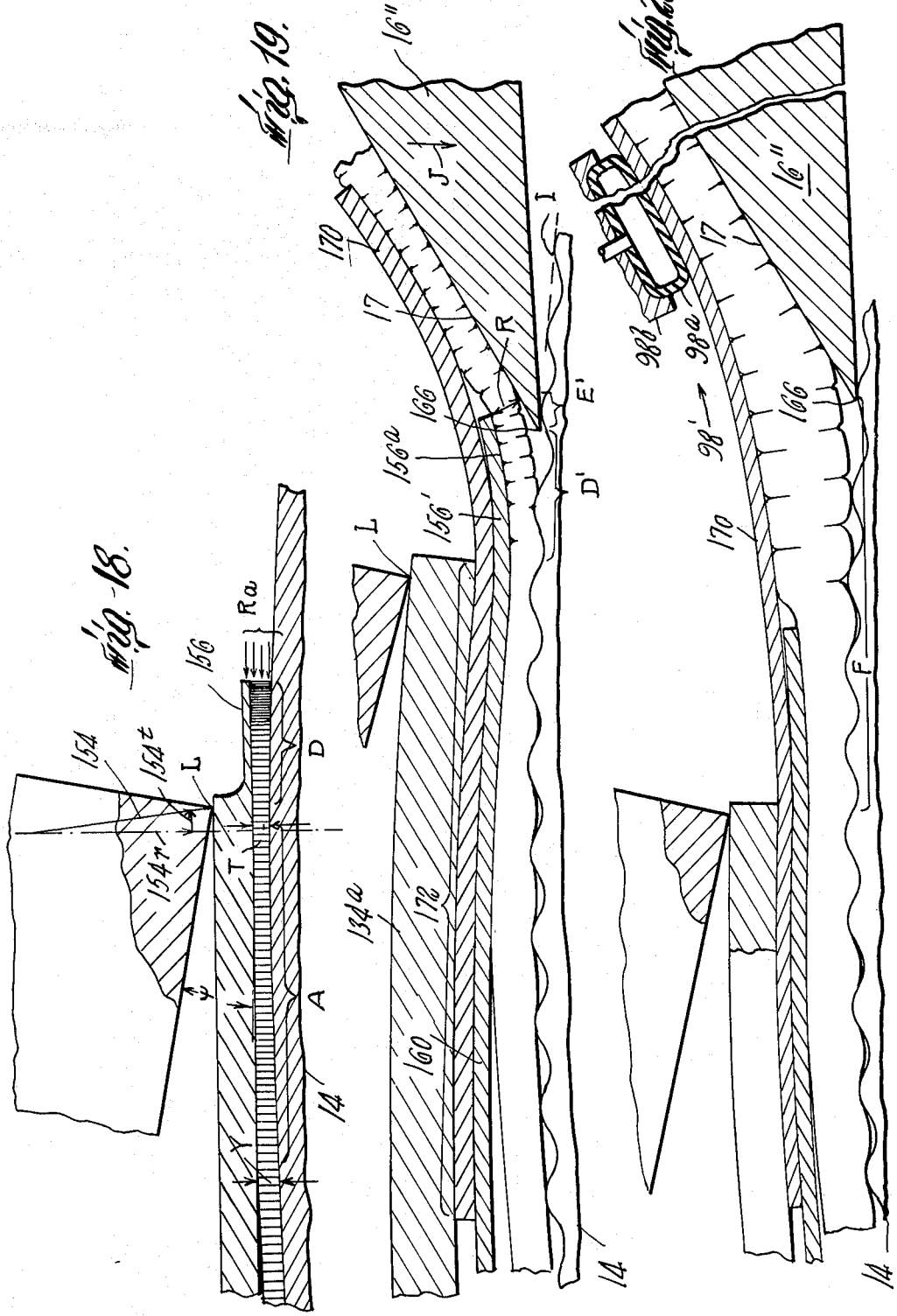

United States Patent Office 3,260,778
Patented July 12, 1966

3,260,778
TREATMENT OF MATERIALS
Richard R. Walton, 10 W. Hill Place, Boston, Mass.
Filed Jan. 23, 1964, Ser. No. 342,589
20 Claims. (Cl. 264—282)

This invention is a continuation-in-part of my application Serial No. 97,606, filed March 22, 1961, entitled "Treating Materials."

This invention relates to the mechanical treatment of materials. More particularly, it relates to the exertion of lengthwise compressive forces upon traveling lengths of thin materials such as textile, paper, metal foil and plastic film.

The main difficulty with prior commercial devices for compressing webs in the lengthwise direction has lain in the limited driving and retarding forces that could simultaneously be applied uniformly to the material. Most attempts to increase the driving force have imposed limitations on the retarding force, and vice versa, resulting in an insufficient degree of change in the web. Other attempts have resulted in unevenness in the application of forces in one way or another, causing variations in the degree of compression or in thickness, either along the length or across the width of the web, or undue degradation of the material. Furthermore, prior proposals failed to enable adjustment of the process to accommodate various kinds of web and webs of various thicknesses and stiffnesses, even though yielding good or excellent results with particular materials.

It is accordingly an object of the present invention to provide an improved method and machine for exerting lengthwise compressive forces on traveling lengths of materials, and to produce materials having improved combinations of various qualities such as thickness, surface evenness, stretchiness, expansibility, readiness of absorption, filter power, flexibility, draping ability, intensity of color, shrinkproofness, compactness, hand, texture, relief from tensile strain and others all with a minimum amount of degradation in strength.

In addition to improving previously known products, I contemplate that completely new products can be produced employing the invention. I have found that extremely high compressive forces and lateral support can be applied simultaneously to the materials so as to produce various unique effects, "lateral" in this case meaning the direction normal to the surface of the material. The products emerge from the novel process in a continuous extruded form having barely perceptible surface variations, if any, and with a surprisingly large degree of lengthwise compression. In the case of creping, an extremely small crepe profile height, i.e. small increase in web thickness, can be achieved simultaneously with high compression, this being referred to as microcreping. With microcreping, in a single pass through the machine, the web length can be shortened to a small fraction of its original length while the crepe undulations are so small and so tightly crowded together as to be seen only by the most careful examination, and sometimes not at all with the naked eye. The adjacent sides of successive crepe undulations are in substantial contact, successive crests are so close together as to give an even surface appearance and the space defined by planes projected on opposite sides of the material tangent to the crests is substantially entirely filled with material.

One of the most striking results obtainable with the invention is in the textile field. Surprisingly, when completely formed fabrics are treated the novel process can produce minute crinkling of the fibers of the component yarns, producing permanent elasticity in the fabric as a whole. Thus the invention provides a very inexpensive means for making stretch fabric after the fabric has been formed, rather than by prior crimping of the individual yarns, although the treatment is also fully applicable to such prior crinkling of yarns and threads.

As one example of treating fully formed textile fabrics thin woven wool suiting material can be given a large amount of permanent stretchiness without imparting crepe. Similar unique results are obtainable with papers, metal foils, plastics and the other thin, flexible materials that are known.

It is, therefore, another principal object of the present invention to provide a process and machine for producing new "micro-condensed" products, the term covering both creped and uncreped varieties.

As a still further aspect of the present invention, beyond that of providing a new process and machine for making conventional and unique products, I have also realized certain principles which have broader application, and it is therefore another object thereof to contribute improvements to previously known processes and machines.

Included in the specific objects of the invention are the objects of providing a means for simultaneously applying extremely strong driving and retarding forces to traveling material; of applying such forces uniformly across the entire width of a wide web and along its running length; of applying such forces in a treatment cavity whose critical dimensions can be accurately adjusted to regulate the thickness of the final products; of applying lengthwise compressive forces under accurately controlled, laterally supported conditions, and with provisions to accommodate irregularities in the material; of applying such forces by means of inexpensive elements, with means for accommodating variations in the elements that result in normal machining techniques; of providing means for enabling smooth movement through compressive treatment of materials that are known to be difficult to feed; and of precisely locating and applying drive forces in a manner to enable accurate adjustment of web-treating machines.

These and numerous other aspects of the invention are more fully explained by reference to the preferred embodiments. Preceding their detailed description, however, some of the features will be mentioned.

Regarding the novel process and machine of the invention, the main drive member and the retarding member are located on the same side of the material, and surface means capable of slippably contacting the material defines a forwardly diverging passage over the driving member and a forwardly converging retarding passage over the retarding member, the passages being constructed and arranged so that the material disengages the drive member and presses against the overlying surface means in advance of the retarding member. After reaching the retarding passage, the compressed material is laterally squeezed by the convergent surfaces and then extrudes through a restriction which can be defined on both sides by surfaces which are in slippable contact therewith.

The characteristics of the means providing the overlying surface and the nature of the surface itself are important. This surface must permit slippage of the material with respect thereto through both the diverging and converging passages and the nature of the slippage must be such as to produce the desired result depending on the characteristics of the material being run. Indeed, it is possible for portions or all of this surface to be very slick because sufficient retarding forces are produced by the material squeezing down to a decreased thickness befor it extrudes. Another important characteristic of this surface is its lateral resilient yieldability, a feature which can be provided, for instance, when the surface-forming means comprises a spring metal shim stock. These and other features of this surface means are hereinafter disclosed and discussed in greater detail.

A drive member found to be most effective, for applying the drive force, particularly when employed with a stationary overlying pressing surface, is a roll having substantially uninterrupted helical ridges and grooves. A retarder plate can be employed with such a roll with its edge adjacent the roll surface, either contacting or not.

For initially pressing the material against the drive member, for driving the material forward, an improved stationary pressing device is provided which has an overlying web-contacting member that converges relative to the driving member to provide a drive passage, and a resiliently yieldable presser member applying downward force on this web-contacting member at the point of maximum convergence, but not rearwardly thereof. A resilient sheet means, preferably including a resilient lip can extend forward of the line to define at least the initial part of the divergent passage.

The invention has numerous other features of substantial importance which will be fully explained in connection with the preferred embodiments which will now be described.

According to the preferred embodiments shown in the drawings, a traveling length of material driven forward by a driving member having a gripping surface is confined by a divergent passage while the material is forced against one end of the pile of the material that has previously been thickened and condensed. A surface overlying the driving member presses the material against the driving member and a forward extension of the overlying surface diverges with respect to that member to define a divergent passage, with this extension in slipping contact with the material. A stationary retarding surface disposed across the exit end of the divergent passage extends from the gripping surface to include an acute angle with the direction of movement of the gripping surface and the material extends at an obtuse angle between the divergent passage and the retarding surface. Forward movement of the material is restrained by a retarding passage formed by the retarding surface and a converging member which overlies it. This retarding passage maintains the end of the pile of thickened material within the divergent passage at such positions that extremely high resistance pressures transmitted longitudinally through the pile can be exerted upon oncoming material in direct opposition to the driving forces and while the material is laterally supported.

Advantageously, the surface overlying the retarding surface is stationary. When the overlying and retarding surfaces are both smooth, they permit balanced slippage of the material extruding between them with generally equal drag effects on both sides to prevent longitudinal relative displacement of multiple layers of material.

I have found that adjustment of the spacing between the angled stationary retarding surface and the overlying member of the retarding passage changes the retarding forces imposed on material extruding outwardly and the character of the built-up pile in such a manner as to permit good control of the operation. Such adjustment regulates the density and position of the pile, obtaining extremely large longitudinal resistance pressures in the diverging passage (force per unit area) to oppose the oncoming material. Where the high resistance pressures needed for microcondensing are desired, the retarding surface and the opposed member forming the retarding passage for smooth operation are preferably resiliently urged together which provides the needed restraint to material passage or by changing the resilient yieldability of that flow.

The spacing between the divergent surfaces is controlled to a substantial degree by the distance of the retarding member from the point of feed, but this spacing may also be controlled by employing a plurality of stepped sheet or layer members to define the side of the diverging passage or by changing the resilient yieldability of that side.

Besides the initial treatments it is possible to accomplish a secondary treatment, e.g. for the purpose of applying a so-called superficial crepe upon the material, by an appropriate spacing between the divergent surfaces at their point of maximum divergency, e.g. by lengthening the divergent passage, or this superficial crepe can even be achieved beyond the restriction of the retarding passage.

In one preferred embodiment a resilient, flexible metal pressing plate is disposed in tangential relation to a feed roll and an adjustable shoe member above the pressing plate bears down upon it at tangency to form the feeding zone. A portion of the plate extending in the direction of feed from the feeding zone defines the upper surface of the divergent passage and a further portion, extending as a cantilever from under the shoe, and sprung against the angular retarding surface provides the retarding passage through which the material is extruded. Other portions of the pressing plate and the retarding surface in some instance advantageously form a transition passage outward from the minimum dimension of the retarding passage for promoting controlled egress of the treated materials. By relative adjustable movement of the retarding surface toward the feeding zone, as by moving it with a constant angular relation to the roll surface, and with corresponding adjustments of the extent the pressing plate projects forward from the feeding zone, the treatment of a given material can be accurately controlled. Thus, beginning first with a coarse crepe, by shortening the distance between the retarding surface and the feeding or driving zone, hence decreasing the pressure chamber length, purely microcondensed material may be produced. Adjustment of the retarding surface too close to the point of feeding thrust will result in cutting of the material by the retarder element edge, but this can be readily observed and corrected.

The invention, including numerous other features, will now be illustrated and explained in detail by drawings and description of preferred embodiments.

In the drawings:

FIG. 1 is a side elevation of a machine for practicing the invention;

FIG. 2 is an isometric view of the trailing portion of one form of sheet metal pressing plate for use under the shoe shown in FIG. 1;

FIG. 3 is a view similar to FIG. 2 of another form of such plate having a serrated edge;

FIG. 8 is a diagrammatic side section view of a greater magnification than FIG. 6 of selected portions of the material shown being microcondensed in FIGS. 6 and 7, illustrating the effect of the conditions imposed on the material;

FIG. 9 is a diagram of the pressure chamber in which the microcondensing operation occurs;

FIG. 10 is a view similar to FIG. 6 of a modification of the machine;

FIG. 11 is a view similar to FIG. 5 showing the effect of the machine when the plate of FIG. 3 is employed;

FIG. 12 is a view similar to FIG. 6 but on a somewhat smaller scale of another modification of the machine, illustrating the compacting of knitted goods;

FIGS. 13 and 14 are exploded isometric and plan views, respectively, of portions of the apparatus shown in FIG. 12;

FIG. 15 is a view of a modification of the machine for microcondensing and successive coarse creping material;

FIG. 16 is a diagrammatic side view of another preferred form of the apparatus of the invention;

FIG. 17 is a view in perspective of a modified and particularly effective feeding device useful in the novel apparatus of the invention;

FIG. 18 is a partially diagrammatic, highly magnified cross-sectional view of the drive path and divergent passages provided by the apparatus of FIG. 17;

FIG. 19 is a view somewhat similar to FIG. 18 showing the feeding device in combination with a retarding member lying on the same side of the material as the driving member;

FIG. 20 is a view similar to FIG. 19 showing the setting for a different treatment.

Figure 5:
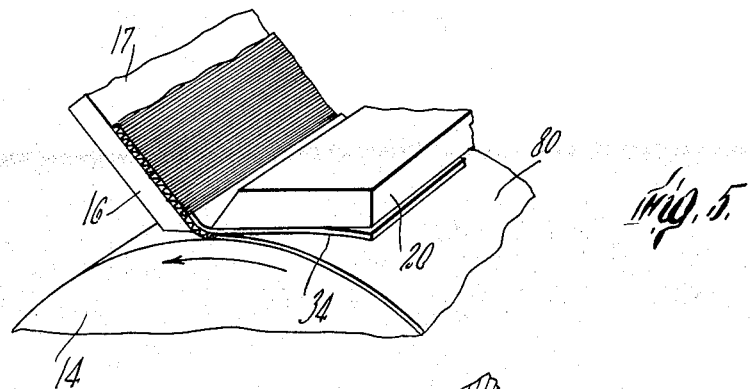
FIG. 5 is a similar isometric view of the machine taken from the opposite side from FIG. 4.
Figure 4:
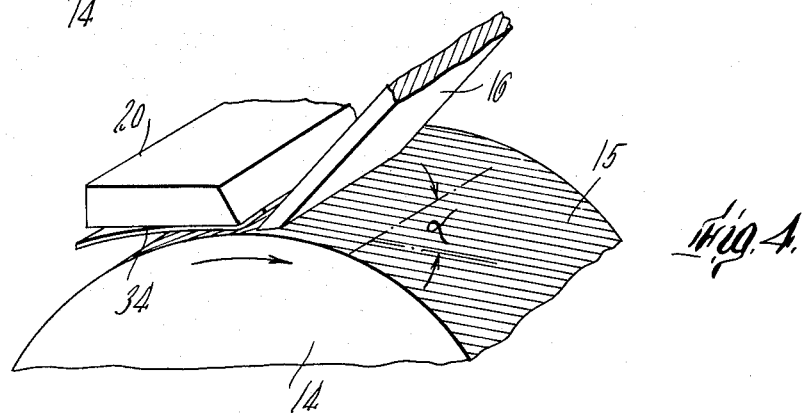
FIG. 4 is an isometric and partially diagrammatic view of elements of the machine of FIG. 1.

Referring to the embodiment of FIGS. 1, 4, 5 and 6, the machine comprises a roll 14, a retarder 16 in the form of a plate having a retarding surface 17 disposed at an acute angle to the roll surface and an overlying resilient sheet member 34 supported by a shoe 20 and extending from a close tangential nip relation to the roll at T (FIG. 6) over a small arc of the roll as a cantilever member to converge relatively to the retarding surface 17 of the retarder. The roll is rotatably mounted in suitable bearings 12 on a base 13. The roll surface comprises a metal cylinder provided with helical knurling 15 in one direction, the knurls extending diagonally to the direction of travel of the material thus have an extent cross-wise to the traveling material for applying forward thrust over the entire width of the material. I have found that such knurling provides a smoothly delivered substantially positive drive of high force values to the material.

Also, along the divergent passage formed between the sheet member 34 and the roll 14 the knurl ribs are caused to wedge retarded material outwardly to disengage from the roll indentations. For this purpose the pushing surfaces of the knurl ribs are sloped outwardly, rearwardly relative to their direction of travel which make the wedging action relatively gradual and nonabrasive, particularly desirable with materials subject to linting or sticking. Good results may be obtained, for instance, by knurling the roll 14 at a frequency of the order of 40 grooves per inch with the knurls disposed at an angle of 60° to the roll axis as denoted by angle α in FIG. 4 with knurling tool type AD 40, having a tooth profile of 90°, sold by the Reed Rolled Thread Die Company. The outer knurl rib surfaces are preferably lightly ground or wire brushed to produce a crest on each rib free from burrs. Where the material tends to work to one side during operation, a light cross-knurling on the roll or longitudinal guiding grooves in the press plate or retarder element to restrain this movement can be employed.

The roll 14 is driven in the direction indicated by the arrow by a suitable drive (not shown) so that the roll surface moves towards the retarding surface. Arranged directly above the roll 14 is bracket 18 on which is mounted shoe 20. The shoe 20 has a smooth generally planar lower surface disposed tangentially to the roll, the trailing edge of which preferably extends beyond the point of tangency indicated by line T.

The shoe 20 is vertically adjustable not only for fine working clearance but also for shifting to and from operative position to permit threading of the machine. To this end bracket 18 is bolted to member 22 by bolts 19 which pass through slotted openings 21 in member 22. Vertical adjustment of bracket 18 and correspondingly of shoe 20 is effected by loosening bolts 19 and sliding the bracket up or down, controlled by set screw 23. For vertically shifting the shoe and bracket assembly to and from its working position, and for holding it in place in this instance, I employ controllable pressure pneumatic cylinder 27 pivotally mounted on support 29 and having piston rod 31 pivoted at 33 to member 22. When the piston rod 31 is moved to raised position (not shown) the member 22 swings about pivot 37 and cylinder 27 may tilt as needed to bodily raise the shoe 20.

Fore and aft adjustment of the shoe 20 is effected with the pressure of cylinder 27 released by moving the member 22 carrying the bracket 18 in a generally horizontal direction by adjusting screw 15 to pivot lever 7 about fixed pivot axis 7a, the lever 7 carrying the pivot 37 for the member 22.

Regarding the flexible and resilient sheet member, it provides a smooth surface at least in the direction the material moves for slippably contacting the material and adjacent extensions of it form the press surface against the roll, the upper divergent passage surface, and the converging member opposite the retarding surface. In this embodiment the sheet member 34 is secured to holder 32, being clamped by members 38 against a mounting surface in the holder 32, and extends forwardly under the shoe, without being secured thereto. The sheet member 34 is independently adjustable in a fore and aft direction upon release of pressure exerted by the shoe by loosening lock nut 24 on bolt 26, bolt 26 being secured to the holder 32 and riding in slot 28, and then sliding both holder 32 and sheet member 34 in the desired direction, the adjusted position of the sheet member edge with respect to the line of tangency with roll 14 being indicated by the gauge 40. Conveniently, the sheet member 34 may comprise shim stock of Swedish blue steel of on the order of .002 to .006 inch thickness. Two forms of sheet members, 34a and 34b respectively, are shown in FIGS. 2 and 3. In the latter the trailing edge 35b of the sheet member has been cut away or serrated, as shown, to produce the patterned effect shown in FIG. 11, discussed later. The forward portion of the sheet member defines with the retarding surface of the member 16 a convergent retarding passage from the pressure chamber against which the material is laterally squeezed and through which the material extrudes. Since the passage is empty at starting, the forward edge of the sheet member assumes the position shown in FIG. 6 in broken lines. During operation it flexes to the position shown in solid lines to effect a widening of the passage sufficiently to permit escape of the thickened material during operation while still applying substantial retarding forces.

It is within the contemplation of the invention that the sheet member 34 or the roll 14 optionally be heated to reduce friction, to soften the material for improved gripping, to set the condensed material, or condition the material for further processing or that it be cooled to dissipate heat generated by friction. I have found that injection of fluid including steam and compressed air at the undersurface of the sheet member aids to reduce friction and lessens power requirements.

It will, of course, be understood that the assembly for driving the material is not limited to this specific arrangement. Those skilled in the art may find it desirable for certain purposes to employ an upper surface of various forms depending on force and length requirements for accomplishing specific results, it being found generally desirable to provide a passage which diverges at a progressively increasing rate. Likewise, an assembly may be made up differently at different locations along its length (widthwise of the material). To decrease power requirement a roll immediately preceding the pressing device may be employed to cause the material to enter surface indentations.

For wide machines a stationary resilient sheet member in cooperation with a curved driving surface is particularly advantageous in providing a treatment cavity of the desired form. By this, the optimum degree of divergency can be obtained for a particular material with adequate support of the surfaces against deflection while permitting the use of a thick hence rigid retarder plate.

The retarder element 16 comprises a substantially stationary member, here a ⅛ inch thick steel plate member rigidly secured to holder 45. The upper retarding surface 17 is preferably smooth in the direction of material movement and generally planar for slippably contacting the material. The surface 17 extends from an edge at the roll away at an acute angle to the roll surface to cause the material to move outwardly at an obtuse angle from the diverging passage. The retarder plate is beveled at an angle from this edge to provide clearance with the roll. This beveled plate can be set by rigidly securing it in its holder, with a permanent running clearance with the roll surface, which may be as much as .002 inch for many materials.

The retarder plate 16 of this embodiment is mounted for changing the angle between roll surface and retarding surface. It is also mounted to bodily rotate about the roll axis so that its edge may be adjustably positioned at the desired distance from the line of thrust between the sheet member 34 and the roll 14. To this end the retarder element holder 45 is supported by a rod 46 mounted on rails 52. These rails are pivoted on pins 60 which are mounted on end plates 54 in general alignment with the leading retarder edge. The pin 50 extending through members 48, 52 and 54 is threaded at its outer end to receive a clamping nut 56. The rail 52 is slotted at 57 to receive the pin 50. When the nut 56 is loosened, the handle 58 may be used to swing the member 52 about pivot 60, and correspondingly move the retarder plate to adjust its angle of tilt relative to the roll surface. The end plates 54 are pivoted on shaft 47 of the main roll so that the retarder plate 16 may be swung about the axis of the roll 14 bodily. This adjustment is accomplished by the mechanism appearing at the lower right of FIG. 1. The link 48 is pivoted to pin 50 at its upper end and at its other end pivoted to an eccentric pivot pin 63 mounted through plate 59 to a rotatable shaft 70. This eccentric pin fits an aperture in the link 48. The other end of the plate 59 is provided with a pointer 65 cooperating with gauge 67 to indicate the adjusted position. The retarder plate 16 is held in position by coaction of clamp 68 with shaft 70. Adjustment is effected by swinging arm 72 by handle 74, the arm 72 turning the shaft 70.

The retarding working surface 17 is disposed with its edge adjacent the roll 14, so that an acute angle is included between the retarding surface and the direction of movement of the portion of the roll surface passing under the retarder edge. The angle must be acute, and not closely approach a right angle, as the latter would cause jamming of the machine and prevent the formation of a pile of condensed material extending in a suitable obtuse angle from restriction, back into the diverging passage, so that resistance forces can be transmitted longitudinally. The angle must be substantial, however, to create resistance forces and to obtain disengagement of the material from the roll without contact with the retarder edge. If the angle is too small, the edge of the retarder will contact the material before the latter has disengaged the drive roll resulting in shearing of the material and jamming of the machine. With a 12 inch diameter roll an angle of 45° included between retarding surface and the direction of movement of the roll surface has been found suitable for most materials. With a 4 inch diameter roll an angle of 37° has been found suitable. Taking into account various suitable roll sizes and the differing character of materials the optimum angle appears to range about 10° on either side of 40°.

Running clearance between retarder plate and roll avoids wear of the elements as well as chatter and other speed limiting effects when the roll surface is generally rough, and high speed operation is made possible. In some applications it may be desired to vibrate portions of the machine to promote smooth movement of the material and this could be accomplished through contact of retarder and rough roll, but preferably through direct controlled oscillation or vibration of any of the surfaces defining the feeding zone and treatment cavity.

Figure 6:
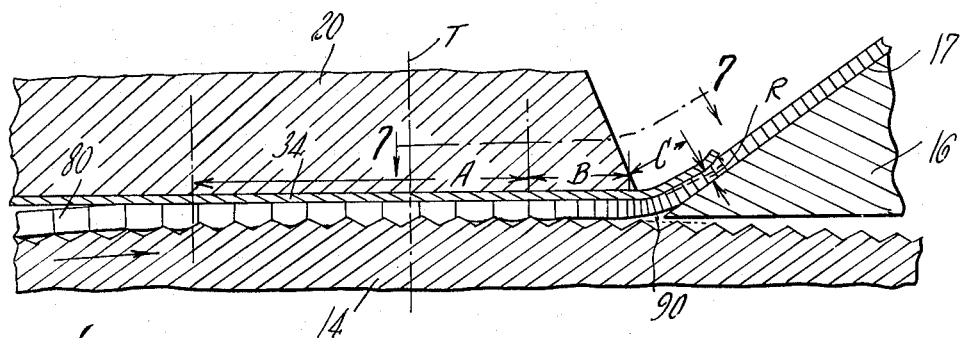
FIG. 6 is a highly magnified, partially diagrammatic sectional side view of portions of FIG. 4 showing a microcondensing operation.
Figure 7:
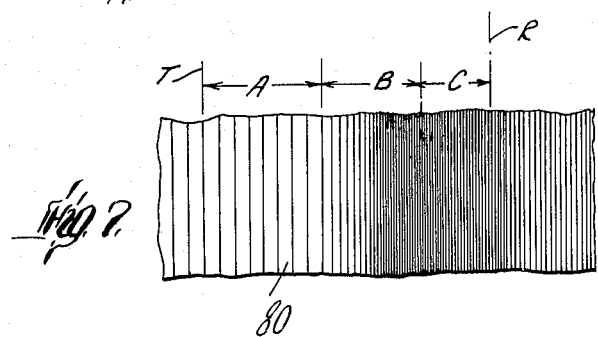
FIG. 7 is a highly magnified diagrammatic plan view of the material being treated in FIG. 6.

Referring now to FIGS. 5–7, in operation, the material to be condensed is led to the kunrled roll 14, is nipped at the line of tangent "T" in a feeding zone A between sheet member 34 and knurled roll 14, and is urged into the treatment cavity defined by the forward portions of sheet member 34, corresponding portions of roll 14, and the retarder 16. The entry to this treatment cavity is the point where substantially positive drive ends, generally corresponding to a separation of the divergent surfaces equal to the "original" thickness of the material, that is, the thickness before treatment, or somewhat less in instances where the material has been matted in the feeding zone. The treatment cavity includes zones B and C as shown in a greatly magnified scale in FIG. 6. The zone indicated by the letter "B" is the condensing zone of the cavity. The zone "C" is the portion of the cavity that is filled by the pile of previously compressed material, this zone defined by successive diverging and converging pile containment surfaces. As shown in FIGS. 6 and 7, the material is microcondensed in zone "B" under sheet member 34 as it is urged forward from feeding zone "A" and encounters the end of the pile of previously condensed material at the beginning of zone "C." This pile end is positioned by opposite surfaces of the passage. The pile extends from this end to the converging retarding passage. An intermediate increment of the compressed pile, extending over empty "V" 90, slippably contacts the overlying convex surface of the sheet member 34 but not the edge of the retarding member.

The material extrudes from under the tip of the sheet member 34 along the retarding surface 17 and if the material is resilient, it then expands to an increased thickness. From there it is led to take-up means or is subjected to further operations. Tension may advantageously be applied in some instances to the emerging material to aid in smoothing the outward movement or for controlling both the pile and the degree of treatment.

It will be appreciated that the combined length of zones "B" and "C" is very small, a small multiple of the thickness of the material being treated. FIG. 6 is substantially a drawing to scale of a .005 thick inch material being micro-condensed on a 4 inch diameter knurled roll. The combined distances of $A+B$ is about ⅛ of an inch, the maximum separation of the divergent surfaces, measured from the roll surface 14 at the edge of the retarder to the opposed surface of plate 34 is about .008 inch, and the minimum opening of the retarding passage between converging sheet member 34 and retarding surface 17 defining the retarding passage is between .006 inch and .007 inch when operating.

As a further example, using the same machine elements, with a soft, double layer thickness knitted goods of a caliper of .033 inch, the maximum separation of the divergent surfaces is .080 inch, proportionately larger than the previous example to allow the resilient material to expand and relieve its pressure on the gripping roll surface near the retarder, and the minimum restriction dimension is .022 inch during operation to produce the needed pile of microcondensed material.

It will be appreciated that the particular dimensions depend upon the particular materials being microcondensed and the desired effect, principal factors being thickness, compressive elastic limit and resiliency of the material. To obtain even-surfaced microcondensed material, allowing for variations in the characteristics of the materials, the condensing zone B is of a length on the order of between 2 and 10 times the original thickness of the material, and the minimum separation between surfaces defining the retarding passage through which the material extrudes is generally less than two times the original thickness of the material.

The treatment cavity dimensions are easily adjusted to change from one to another material by vertical and fore and aft adjustment of the shoe 20 and sheet member 34, rotating the retarder element 16 about the axis of roll 14. Similarly, for any given material being processed, it is a matter of simple adjustment to vary the relation of the elements to achieve optimum microcondensing. Within the limits of smooth movement of the materials through the treatment cavity, the closer the edge of the retarder element is adjusted toward the feeding zone A, with corresponding shortening of the extent the sheet member 34 overhangs zone A, thus shortening the treatment cavity length and lessening the separation of the surfaces, the finer will be the microcondensing. The limit to this adjustment occurs when the retarder edge is inserted so far towards the feeding zone, between the divergent surfaces, that the material is sheared by the retarder edge before it can disengage the moving surface. Adjustment in the opposite direction, extending the treatment cavity thereby increasing the maximum separation of the diverging surfaces, permits the application of a coarse crepe to the material.

Referring to the diagrammatic view of FIG. 8, in conjunction with FIGS. 6 and 7, various stages of the operation are illustrated, with equal mass increments of material 81–86. Increment 81 is untreated and has an original thickness Y. Increment 82 in feeding zone A is pressed so that an underportion of the material is engaged within surface indentation 15a of roll 14, and the material is thrust forward by the moving surface. The material moves with a speed corresponding generally to the surface speed of the roll 14 indicated by the equal length of the velocity vectors associated with the increment 82 and the roll 14. In the condensing zone B, a similar increment of material 83 is shown partially microcondensed in the divergent passage due to the positive feeding forces exerted at the pressing zone and the opposing forces transmitted by the pile of previously microcondensed material in successive divergent and retarding containment in zone C. Thus, as indicated by the velocity vectors, increment 83 moves substantially slower than the roll 14 while it is slippably laterally confined by the sheet member surface 34, preventing expansive release of compressive pressure. The outwardly, rearwardly sloped leading wall 88 of the corresponding surface projection moves forward relative to the undersurface of the material and wedges upward the portion of the material which has previously been forced into indentation 15b. It is advantageous that the forward boundary of the increment of material is forced to slant upwards as shown due to this action of the surface projection as well as the relative movement between the drive roll 14 and the sheet member 34.

The microcondensing continues in zone B and at the general boundary between zones B and C the increment of material 84 has been completely microcondensed. This increment was engaged in indentation 15c in the feeding zone A, it was wedged upwards to disengage this indentation in the microcondensing zone B, and as it progressed through zone B, it had contacted a number of successive knurl projections. On arriving at zone C, this increment of material still laterally confined and positioned by the opposed surfaces of the divergent passage, enters the pile of previously compressed material, and resistance forces are transmitted back through this increment to the oncoming material.

In build-back pile zone C, the material increment 85 encounters the retarding surface 17 as it is diverted upwardly and enters the retarding passage formed between the retarding surface and the end portion of sheet member 34. It will be noted that the material as it moves along is generally aligned with the restricted opening so that the thrust of the material is opposed head-on by the convergence of the passage. From here the material 86 is extruded through the minimum restriction R.

Referring to FIGS. 6 and 8 in particular, it will be seen that the empty, albeit tiny "V," 90, occurs at the tip of the retarder as the longitudinally compressed material disengages from the roll surface and moves to the retarder surface, and the roll surface moves with running clearance under the retarder element.

In cooperation with the angle of the retarding surface, it is found the forces acting on the pile of condensed material promotes the change in direction from the moving surface through the obtuse angle to the stationary retarding surface over the short length involved without touching the edge of the retarder. The cross-section area of the pile at the retarder edge, which transmits the resistance to thrust, being proportioned to substantially exceed the cross-section of the microcondensing zone, the longitudinal compressive unit pressure is correspondingly less in this area so that the tendency for expansion of material in response to longitudinal compression is less than that which would tend to fill the "V."

Referring to the diagram of FIG. 9, W indicates the nip thickness of the material, Y indicates the original thickness of the material, Z indicates the maximum separation of the divergent surfaces, R indicates the minimum separation of the surfaces of the retarding passage, referred to as the retarding restriction, $\theta$ indicates the obtuse angle between material on the moving surface as it approaches the retarding surface and the resultant of retarding forces imposed by the retarding passage at its retarding restriction R and $\phi$ indicates the substantial acute angle included between retarding surface and the direction of movement of the traveling surface. The treatment cavity comprising zones B+C begins where the diverging walls are spaced apart a distance Y corresponding substantially to the original thickness of the material. The separation of the diverging surfaces increases progressively to its maximum dimension Z and then the cavity converges to the retarding restriction R. In operation the pile of microcondensed material extends through the obtuse angle $\theta$ back into the divergent passage from retarding restriction R, through the maximum dimension Z, thus longitudinally transmitting resistance forces from the retarding passage which oppose the fresh material forced forward into the divergent passage. Change in the retarder angle $\phi$ changes the value of obtuse pile angle $\theta$ for any given relation of the other elements. With this preferred embodiment, in order to obtain the needed high resistance forces in the needed short length treatment cavity, and to obtain smooth movement of the material from the traveling surface to the retarder surface without cutting, the angle $\phi$ must be substantial, and not highly acute. But if angle $\phi$ is too great, then the pile of condensed material will buckle into the open "V" causing jamming of the machine or shearing of the material. Thus, angle $\phi$ must be a substantial acute angle as noted above. For any given set of conditions there is generally found an optimum angle setting which cooperates with the force action of the other elements to obtain optimum microcondensing. It has been found that with changes in the total dimension B+C to treat differing materials which involves substantial movement of the retarding surface relative to zone A, if the angle $\phi$ remains constant, smooth flow of the material and proper transmittal of resistance by the pile results.

As noted also above, the length of the treatment cavity varies with the character of the material being treated. However, it must always be a very small percentage of the total circumference of any roll that is employed as the moving gripping surface and the separation of the diverging surfaces must be at a rate sufficient to permit release of the lateral pressure exerted by the pile upon the moving surface preceding the retarding surface.

As noted with reference to FIG. 6, the cantilever end of the sheet member 34 extending beyond the shoe 20 is sprung towards the retarding surface 17. This permits the use of high pressures in the chamber by smoothing the extruding flow so that continuous microcondensing can be obtained despite variation in the thickness of outflowing material. It also ensures at start-up a substantial restriction to movement of unthickened material for initiating the build-back of the pile, although it will be understood that the initial obstruction needed for initiating the action may be provided in other ways, such as by jamming material by hand into the retarding passage.

Referring to FIG. 10 in another form, the upper wall is entirely rigid which provides a treatment cavity more rigidly defined than that of FIG. 6 and permits the microcondensing of very stiff material. Resilient maintenance of microcondensing can be achieved by resiliently urging the retarder element 16 toward the rigid overlying shoe tip by a pneumatic jack 106 as shown in FIG. 16.

A further feature of the embodiment of FIG. 10 is provision for controlling the temperature of machine surfaces engaged on the material, here comprising a heating coil element 77 extending over the upper surface of heat conductive shoe 20a, and electrical resistance heater wires 79 disposed in passages of the roll. These heating elements not only reduce the friction between the material and the heated surface, but also soften stiff thermoplastic materials, allowing the material to be gripped by the driving roll, and permanently condensed and heat-set in the diverging passage. Similarly, the surfaces can be cooled.

Referring to FIG. 11, the serrated forward edge of sheet member 34b of FIG. 3 may be employed in microcondensing sheets of heavy, stiff paper. As indicated, the roots of the serrations extend under the shoe 20b towards the nip tangent T so that the confinement of the retarding passage is interrupted at intervals across the width of the sheet. The paper passing under the pointed teeth is strictly contained throughout the treatment cavity and is microcondensed. The paper passing under the open serrations is restrained due to retarding forces imposed sideways through the paper from adjacent portions being microcondensed. Thus, the uncontained portions are treated as at 91 but without the even surfaces of the portions 92 which pass from under the teeth. In addition to imparting an unusual and sometimes desirable alternately even and rough surface appearance to the paper and the like, extreme condensing is achieved with a greatly diminished total force requirement from that required to microcondense uniformly across the sheet.

A further feature of FIG. 11 is a means for introducing an antifriction fluid to the machine, comprising a compressed air supply tube 97 extending over the press shoe, and a plurality of air passages 98 extending downwardly from the tube to outlets at the material.

As examples, the invention enables microcondensing of woven, nonwoven and knit textiles for imparting permanent elasticity, shrinkproofness, improved hand and drape and various other functional characteristics. It also enables microcondensing of papers and similar materials in an essentially dry state to remove internal stiffness and produce increased flexibility so that the material readily drapes and is stretchy and soft. With insulation papers and the like, microcondensing produces in a unit length, an unusually high amount of even-surfaced stretchy paper for a given increase in caliper by which I can minimize thickness of electrical cable wrappings and provide smooth surfaces to such wrappings. By the invention it is possible to microcondense dry tissue paper to shorten it 400 percent and more (measured in percent increase of material occupying a unit length as compared to uncondensed goods) to obtain an extremely soft, absorbent and smooth sheet. Material which has already been condensed widthwise as by my invention described in copending application Serial No. 855,630, can be longitudinally condensed to provide a two-way stretch effect.

By microcondensing, wetted papers can be shortened as much as 700 percent while obtaining a generally smooth surface; plastic films can be rendered relatively soft, elastic and flexible with a textured appearance; metal foils can be processed to obtain a minute, barely visible crimp in a highly condensed form, which provides a very extensible product, having a relatively dull, smooth surface.

Multiple layers of papers and the like can be simultaneously microcondensed and then separated, if desired, to obtain a high production rate. Intimate contact between multiple layers obtained with simultaneous microcondensing is useful in bonding them together in a lamination. Braided, twisted or untwisted paper rope can be microcondensed to impart high stretchiness or flexibility. Nonwoven textiles when microcondensed have an improved surface texture which approaches that of woven goods, and increased softness. Shiny fused warp ribbon when microcondensed has a dull, more intense color and a smooth, velvety appearance. Microcondensing yarns and string produces a fine, virtually invisible crimp. In addition to the uses on textiles described above, another use is in the sewing industry in which fabric edges to be gathered and sewn together are first condensed by a pass through the machine, thus avoiding wrinkles at the final seam.

Compressive treatment in accordance with the invention is particularly advantageous in connection with materials such as tubular knit fabric, which are treated in double layer form. In this respect, retarding of the material to effect longitudinal compression is accomplished by passing the material between two stationary surfaces forming the retarding passage. As previously mentioned, the arrangement is such that both layers of the tubular material are subjected to equal restraining forces, and this effectively avoids any tendency for the two layers of material to shift longitudinally, one with respect to the other.

Such material is very resilient, that is it has a high compressive elastic limit and expands quickly and substantially when compressive pressures are released. This material must be greatly compressed in order to be shrink-proofed, hence the divergent passage must extend to a relatively wide cross-section in comparison with that of the microcondensing zone, to release the material from the moving surface following microcondensing and preceding the retarder to avoid jamming thereunder, all in accordance with the explanation of operation given above.

Referring to FIGS. 12–14, a preferred modification of the device for shrinkproofing soft goods such as double layer cotton knitted material is shown. The forward portion of a flexible, resilient sheet member 34″ sprung against the retarding surface 17 is reinforced by imposing thereon a downward force at a point spaced toward the edge of sheet member 34″ from the point of cantilever support to provide the minimum distance convergence at $R_1$ defining the retarding passage outlet from the treatment cavity. This gives added rigidity to preserve the restriction while avoiding introducing such stiffness generally as to create risk of jamming under microcondensing pressures. In this embodiment the downward force is applied through a cantilever member 94 of spring steel, disposed generally parallel to plate member 34″, and spaced above it by spacer 96, all three elements being secured to the shoe 20′.

A further feature of the trailing edge of the sheet member 34″ is that it extends beyond the restriction $R_1$ defining a resilient transition zone, here provided by a plurality of spaced-apart elongated fingers 98. As shown in plan, these fingers preferably have a narrowing shape from root to tip. This transition zone is important in providing a smooth treatment to the material, preventing jamming, spurting and intermittent flow and also in giving fine control to continuous pile extrusion. A possible explanation for the operation of these fingers may lie in the fact that where material is longitudinally compressed, the substantial longitudinal forces necessary to extrude the material through the retarding passage restriction are translated into an expanding tendency normal to the sheet plane. When this expansive force occurs in a line across a sheet, frictional restraint of adjacent portions of material at the minimum dimension $R_1$ of the retarding passage tend to bind the sheet from even outward movement. Without the transition zone the relation between the elements defining the outlet can be critical and a restriction dimension in the retarding passage which provides sufficient restriction to create a compact pile of material for microcondensing, creates a risk of intermittent binding of the material at the restriction and subsequent spurting, thus varying the resistance forces and the degree of condensing. The spaced fingers remove this criticality. They define an elongated transition zone. The relief of the normal oriented expansive forces is begun at the restriction $R_1$, breaking up the line of forces across the material by relieving the pressure at spaced intervals, and the relief continues smoothly increasing as the material moves outwards providing a gradually diminishing restraint, over a considerable distance, and stable conditions in the treatment cavity are obtained. With the particularly preferred curved finger profile, as the distance from the root increases, the open area between the fingers also increases at an increasing rate. It is possible to shape the finger length and profile over a wide noncritical range, and an optimum condition can be permanently achieved for any particular material.

Referring to FIG. 15, an embodiment is illustrated which achieves both controlled microcondensing and controlled coarse creping of the material thereafter. The microcondensing treatment cavity is formed between roll 14, overlying plate 102 and the portion of the retarding surface 17 of retarder element 16 closest to the roll, all of which can be, as shown, similar to the embodiment of FIG. 10. Spaced above the plate 102 is a resilient flexible sheet member 100 extending in cantilever form out from shoe 20″ so as to overlie the exit from the treatment cavity and converge against an upper portion of the retarding surface indicated at 17′. There is thus formed a succeeding passage into which the microcondensed material is extruded as it passes from the treatment cavity. This succeeding passage has substantially larger dimensions from that of the microcondensing treatment cavity as indicated in the figure. The restriction at 17′ causes the material passing through this passage to crepe. Adjustment of the retarder element 16, in addition to controlling the form of the microcondensing cavity, also regulates the shape of the superficial creping passage. Thus, the retarder element can control both operations. Alternatively, pressures can be varied on the trailing edge of sheet member 100 to separately control the creping.

Referring to FIG. 16, another preferred embodiment employs a replaceable retarder element 16′ rigidly mounted on support 45′ which extends close to the leading edge of element 16′ to insure constant pressures and clearances without deflection. The working surface of the retarder element is positioned in the optimum angle relative to the roll surface for the particular roll and materials to be treated, and is mounted at that angle to arm 104 which pivots about the axis of the roll 14, permitting rotation of retarder element 16 with constant angle relative to the roll surface, towards and away from the nip T. A pneumatic jack 106, pivoted on a fixed support at 110, and pivoted to the arm 104 at 108, is regulated by a valve 112 to position the retarder element and control of the force of the jack controls the operation. The jack also provides resiliency to the retarding passage to resiliently initiate and maintain the microcondensing, to allow for passage of foreign articles and to prevent jamming of material of unusual thickness which might occur. Stop members 120 can be adjusted to control the minimum distance between retarder element and shoe and the size of the retarding restriction of the retarding passage while preventing damage to the material or damaging impact between retarder element and shoe.

Another feature of FIG. 16 is an eccentric vibrating means for vibrating one of the surfaces defining the treatment cavity to improve flow of the material. Here this means comprises a cam 114 having eccentric portions and a motor 116 shown diagrammatically for rotating the cam imparting a periodic force to the retarder to vary the pressure it exerts on the material. The shoe can be similarly vibrated.

In another embodiment the retarder element may be stationary and all of the adjustments can be effected by movements of a sheet member towards and away from the roll and the retarder.

In yet another embodiment the retarder and the corresponding edge of the opposing member may be set widthwise at an acute angle to the direction of movement of the material, and the material may be microcondensed and move outward diagonally. Successive machines imposing right and left treatments will impart microcondensing in transverse and longitudinal direction.

In another embodiment the means providing the surface that overlies the driving and retarding members may take the form of a sheet of durable slick and flexible material such as polyester film (polyethylene terephthalate) wrapped for resilient support around a cylindrical core, e.g. of rubber or plastic foam. The cylindrical member can be freely rotatable and pressed against a smooth-surfaced driving roll. The convergent retarding passage can be formed with a pointed edge retarding plate of the kind described above, with an extended retarding surface set at a substantial acute angle to the tangent at the nip line of the two rolls. The convergent retarding passage accordingly is defined by the retarding surface and an overlying portion of the cylindrical polyester surface, the latter being able to slip past the pile of compressed material so that the pile is maintained steadily in the passage and not allowed to spurt out, whereby uniform treatment can be accomplished.

In still another embodiment the driving member can take the form of a moving belt, either flat or curved.

In the embodiments in which the surface overlying the driving roll is stationary, it is presently preferred to employ an improved pressing device at the feeding zone having a forwardly extending web-contacting member that converges relative to the roll and a pressing member acting on the forward part of the web-contacting member to press that part toward the roll. The pressing member concentrates its forces on the web-contacting member substantially on a line parallel to the roll axis, but is resiliently yieldable in the direction normal to the surface of the material. The web-contacting member is preferably formed of resilient sheet metal projected forward as a cantilever from a support with the sheet metal being deflected into a desired converging relation to the roll by the pressing forces. When using such metal sheet, care must be taken that it be of sufficient hardness and stiffness that it will not detrimentally deform, e.g. dent locally under the line of forces or pucker to the rear of that line. If such denting or puckering occurs, uniform drive across the width of the web is lost and a tendency is created for the material to prethicken and jam. Also useful to avoid this problem is a cushion layer, e.g. of rubber, employed between the pressing member and the sheet metal layer, which also provides desirable resiliency.

It is advantageous to apply the line of forces by means of a cantilevered resilient member in the form of a plate of spring metal whose free end defines a pressing edge, the plate mounted so that only the edge can contact the web-contacting member.

A further improvement lies in the use of a resilient sheet means to extend forwardly of the maximum convergence of the drive passage, forming a divergent passage into which the material is driven whose walls are resiliently yieldable in the direction normal to the surface of the material. Usually, for best effect, a resilient lip is provided that extends only a short distance forward of the line of forces, and a second resilient sheet lies over the lip and projects substantially therebeyond. While the surface of the sheet means contacting the material is preferably metal, for durability, outer layers can be formed of other substances, thus a layer of metal and an outer layer of rubber can be combined to form the resilient sheet means.

With reference now to FIG. 17, a rotatable roll 14 is provided with a drive means 13. The peripheral surface 15 of the roll is defined by substantially continuous knurl ribs and grooves set an an acute angle to the direction of travel as in the previous embodiments. A shoe apparatus 122 associated with the roll includes supporting arms 124 mounted to pivot between operative and inoperative positions about an axis 126 parallel to roll axis 114. A shoe head member 128 is mounted to move toward and away from the driven roll 14 in the direction of the arrow 129. A holder 130 mounted on head member 128 supports a web-contacting member 134 having an extended portion that projects forwardly about an arc of roll 14 in a continually converging relation, the member 134 being in the form of a cantilever. On forward portion 136 of the head member 128 a pressing member 138 is mounted by mounting plate 140. Preferably, as shown, the pressing member 138 is a plate that is resiliently yieldable in the direction normal to its sides, and this plate projects forwardly from its mounting as a cantilever. The lower side of the pressing plate member 138 can be flat, and at the free end intersect an end surface 144 to define a continuous, straight pressing edge 146 that is parallel to the axis 114 of the roll 14, and this edge 146 is pressed against the forward margin of web-contacting member 134, the angle of the lower side of the pressing member 138 being set at an acute angle $\psi$ to the surface 15 of the roll directly under the pressing edge 146. A number of air cylinders 148 are mounted above the operative position of the shoe head member 128 and are provided with adjustment devices 150 for varying the downward force applied through piston rods 152 to the shoe head member 128.

As shown, the web-contacting member 134 is a shim stock sheet metal member that is resiliently yieldable in the direction normal to its side, and it is deflected into a curved configuration by the action of the force applied to its forward margin, this sheet member having sufficient hardness and stiffness to be resistant to detrimental deformation by the pressing edge 146, while having sufficient flexibility to be bent about the roll in a continuously converging manner.

As the pressing edge 146 presses toward the roll, a line of forces L is applied to the margin 135 of the member 134 causing its forward margin 135 and the peripheral surface of the roll to define the maximum convergence of the feeding zone, at which the maximum driving effect is applied. The series of circumferentially spaced projections and indentations in the surface of the roll define with the curved member 134 under the line L a series of pressure areas of extremely high lateral force enabling the roll to apply a high forward drive force and preclude rearward slippage of the web; as the roll turns, the locations of the pressure areas progressively change, due to the helical form of the ridges, but a series of them is continually presented under the edge 146.

With regard to the specific dimensions and relations of the elements, the pressing plate member 138 is resilient but has a substantial degree of stiffness. Advantageously, it comprises a plate of spring steel of a thickness between about 1/10 and 1/25 of an inch, and projects freely from its mount a distance of about 1 inch. The web-contacting member 134 when in the form of a resilient sheet member is more flexible than the pressing plate member 138, and is advantageously formed of spring steel such as blue steel shim stock of a thickness on the order of between .010 and .020 inch, the larger the diameter of the roll, the greater the thickness. The acute mounting angle $\psi$ of cantilevered member 138 relative to roll 14 enables its resiliency to act with a substantial component in the direction of the radius of the roll, and the more acute angle $\psi$ is, the less tendency is there for the pressing edge 46 to move forward and back as the pneumatic cylinders 148 increase and decrease the pressing forces. When the pressing member is in the form of a flat plate, the acute angle $\psi$ must be sufficiently large, however, to maintain line contact between the pressing edge 146 and the margin 135 of member 134, because if the lower flat surface of the pressing plate extensively engaged the web-contacting member 134, the position of the maximum drive forces would become indeterminate and the apparatus would become more difficult to adjust. It has been found that with a roll of 10½ inch diameter, angle $\psi$ can advantageously be permanently established at the value of 10°. Should it be desired to decrease the resiliency at edge 146 it is possible to increase angle $\psi$ to decrease the effective resiliency of the plate member 138 in the radial direction of the roll without affecting its actual stiffness, but it is also possible to employ a thicker pressing plate member or laminate two together or provide lateral support to the original plate member.

By the combination described above extremely high drive forces can be produced while providing lateral resiliency so that uniform feed can be achieved throughout the width of material to be treated.

While it is presently preferred to maintain the web-contacting member and the pressing member in continuous contact across the width of the machine, it is possible for one or the other to be discontinuous. For example, the pressing member could have a serrated pressing edge, or the web-contacting member could be serrated or scalloped. Similarly, the pressing or web-contacting member could be formed in sections, particularly if a long drive roll is employed.

Referring to the partially diagrammatic cross-sectional view of FIG. 18 wherein like elements to FIG. 17 are assigned like characters, a resilient lip 156 is provided as a relatively thin forward extension of web-contacitng member 134. The extended converging feeding zone A between the member 134 and the roll 14 extends substantially to line L and the resilient lip 156 defines forwardly a divergent treatment passage D with a forward extension of the surface 15 of the driven roll. In this embodiment a flexible web 158 having an untreated thickness Y is shown at the left entering between the roll 14 and the member 134. As the material proceeds through the converging feed path A, it is gradually pressed by member 134 into gripping engagement with the driven roll until at line L a minimum dimension T is reached substantially less than dimension Y, establishing a precisely located line of maximum drive force. As illustrated at the right in FIG. 18, retarding forces $R_a$ can be applied to the web in the divergent passage D under the resilient lip 156, and the web can thereby be subjected to simultaneous lengthwise compression and lateral support. The lateral support applied by resilient lip 156 to the side of the web increases the lengthwise pressure and prevents lateral distortion of the material, while providing a resiliently yieldable buffering action in the direction normal to the surface of the material. This makes the divergent passage self-adjustable to accommodate pressure fluctuations in the material and variations in the character of the material and in the relation of the machine elements. Advantageously, the full length of the resilient lip 156 comprises spring steel sheet, e.g. blue steel shim stock, of a thickness between about .002 and .008 inch.

As illustrated by the arrow 154 the direction of adjustment of the pressing edge 146 towards the roll 14, provided by the movement of piston rods 152 and shoe head member 128 (FIG. 17), has a tangential component of adjustment $154t$ in the direction of the travel of the roll 14 as well as its principal radial component of adjustment $154r$. The tangential component $154t$ tends to tension the member 134 in the forward direction rather than place it under compression when the forces of the pressing edge 146 are increased. This decreases any tendency of the member 134 to pucker or otherwise locally expand the drive path preceding the pressing edge 146.

Referring to the preferred embodiment of FIG. 19, the feeding apparatus of the invention is shown in a cooperative relation with a retarding member 16" of the type already described. The feeding apparatus differs from FIG. 18 in that the web-contacting member is defined by a plurality of spring metal layers and the resilient lip 156' is not an integral extension of the thicker member 134a but is a forwardly extending margin of a relatively thin resilient sheet member 160 which directly contacts the web.

In this embodiment the pointed leading edge 166 of the retarding member 16" is located under the resilient lip 156', the forward portion of the lip 156' converging relative to the retarding surface 17 to define restriction R. Thus adjusted the first portion of the lip 156' defines with the surface of the roll a divergent passage D' forward of line L and a small forward portion of the lip 156' defines with the retarding surface 68 a convergent passage E'.

A third resilient sheet member 170 has a leading part 172 disposed for support between the member 134a and the web-contacting sheet member 160. The forward portion of this sheet member 170 extends over the lip 156' and beyond it a distance substantially greater than the forward extent of lip 156', and converges relative to retarding surface 17 beyond the resilient lip 156'.

The surfaces of sheet members 160 and 170 preferably are allowed to be polished by the movement of the web to avoid frictional drag. The web slides relative to these surfaces and extrudes from the machine. The retarding forces applied by the restriction R created by the retarding passage E and the secondary retarding forces applied by the convergent passage forward thereof are transmitted back through the web to cause compression of the web as it moves through the diverging passage D'.

By using the two-layer construction for the overlying surface, adjustment of retarder 16" relative to the resilient lip 156' will establish the appropriate treatment cavity dimensions, particularly the spacing between the divergent surfaces, and it will provide resiliency in the divergent passage. The total amount of retardation, however, will depend also upon the second sheet member 170, and hence retardation becomes an independent variable, adjustable, for instance, by changing the substance or thickness of the sheet member 170 or its forward extent. Because member 156' has no great forward extent, the lever effect due to forces acting on its outer end is limited, which enables the treatment cavity dimensions to be more accurately established. Furthermore, the tendency for permanent detrimental bends to form, which can occur where a single sheet member performs all functions, is avoided by the multiple piece construction.

As in previous embodiments, a turning tendency is set up in the material in advance of the retarding member, pressing the material against the overlying surface, i.e. the first part of resilient lip 156'. The driving member applies a forward force tangent to the roll, preferably together with a wedging action when surface projections are employed. The rearward force is supplied partly by drag of member 160 and partly by the restricting effect of the divergent passage.

Referring to FIG. 20, the machine of FIG. 19 is adjusted to provide a less fine treatment. The leading edge 166 of the retarding blade 16" is moved to the right from under the resilient lip 156' to define a divergent treatment cavity F. The treatment occurs just as the material emerges from under the resilient lip 156' so that here again the resilient lip has a fluttering action in response to pressure fluctuations and enables machine elements made with conventional machining tolerances to treat extremely wide webs, despite some roll deflection in the center of the web, and slight deviations in alignment. The end of the resilient lip precisely locates an abrupt change in cross-section of the divergent passage which in many cases is useful in precisely defining the point at which creping or condensation occurs.

Another feature of FIG. 20 is the use of an additional device 98' for resiliently reinforcing the forward part of the overlying surface. Device 98' is a flexible hollow tube 98a mounted in a stationary holder 98b. The amount of reinforcement is varied by varying the fluid pressure within the tube.

Another feature of FIGS. 19 and 20 is that the pointed leading edge 166 of the retarder plate 16" in this embodiment is formed of a wearable material such as brass and is set in the direction of arrow J by a mounting, not shown, bearing resiliently against the imaginary cylinder I projected through the crests of the projections at the roll periphery. These projections are defined by helical ridges as in FIG. 17, hence a series of constantly changing contacting points between roll 14 and retarder edge 166 is always preserved along the length of edge 166 in a manner similar to the contact points of a lawn mower cutting reel and its stationary blade, constantly preserving the proper relation between the elements.

In such an embodiment it is advantageous for the retarding member to have sufficient resiliency as to deform to the shape of the drive roll, should the roll deflect at the center or have irregularities. The retarding member, for instance, can be defined by an elongated brass strip ⅛ inch thick and 4 to 6 inches wide, with the edge pressed by a holder against the roll.

In the various embodiments it will be obvious that the machine elements can have a widthwise extent greater than that of the material to be treated, a useful provision where treatment throughout the width is desired, or the width of the material to be treated can be less than the overall width of the material, with material extending from one side, e.g. when gathering a fabric edge to be sewed, or on both sides, e.g. for allowing the material to prevent contact between surfaces of the machines.

It is evident that numerous of the specific details can be varied within the spirit of the invention and its scope as defined by the following claims.

What is claimed is:

1. A machine for treating lengthwise traveling material comprising a driving member, means to press said material against said driving member to drive it forward, a retarding member adapted to slippably contact said material, said retarding member located on the same side of the material as the driving member, said retarding member having a widthwise extending leading part located adjacent to said driving member substantially throughout the widthwise extent of the material to be treated and having a surface adapted to direct said material away from the surface of said driving member at an acute angle to the direction of movement of said driving surface, and a surface means extending over both said driving member and said retarding member in the region where the material moves from said driving member to said retarding member, said surface means arranged to slippably contact said material during its passage through said region, said surface means and the driving member defining a passage which diverges to said retarding member and said surface means and the retarding member defining a retarding passage that converges forwardly from said leading part.

2. The machine of claim 1 wherein said retarding member is substantially stationary, having a leading part in the form of an edge extending across the width of the material being treated, and the part of said retarding member that is first contacted by said material extends forwardly from said edge at a substantial acute angle to the direction of movement of the driving member at said leading edge.

3. The machine of claim 2 wherein said driving member is in the form of a generally cylindrical rotary surface and said retarding member defines a substantially planar surface, said surface being set at an angle between about 30° and 50° to the tangent to said cylindrical surface at said leading edge of said retarding member.

4. The machine of claim 1 wherein said surface means over both said driving member and said retarding member are resiliently yieldable in the direction normal to the surface of the material.

5. The machine of claim 1 wherein said means to press said material against said driving member is substantially stationary and said surface means is defined by a resiliently yieldable member extending forward from said pressing means.

6. The machine of claim 1 wherein said driving member is a rotatably driven roll having its peripheral surface in the form of circumferentially spaced-apart projections and indentations distributed substantially uniformly throughout the length of said roll, the outer extremities of said projections aligned to lie in an imaginary cylinder having an axis corresponding to that of said roll, the leading part of said retarding member lying adjacent to the surface of said imaginary cylinder.

7. The machine of claim 6 wherein said projections and indentations are defined by helically arranged ribs and grooves extending diagonally to the direction of travel of the material.

8. A machine for treating lengthwise traveling material comprising a driving member, stationary means to press said material against said driving member to drive it forward, a retarding member located on the same side of the material as said driving member, said retarding member being substantially stationary, having a widthwise extending leading edge located adjacent to said driving member substantially throughout the widthwise extent of the material to be treated and having a part extending forward from said edge over which material can slide, means defining a stationary surface on the other side of said material that extends over said driving member and said retarding member in the region where the material moves from said driving member to said retarding member, said surface diverging from said driving member to a maximum cross-section adjacent to the retarding member edge and converging toward the retarding member to define therewith a retarding passage, said surface positioned for slippable contact with the material and offering lateral support thereto, the size and relationship of said passage being such that said material can separate from the driving member and be pressed against said surface means before it reaches said retarding member, the retarding passage adapted to laterally squeeze the sides of the material to apply retarding forces while allowing it to extrude forwardly.

9. In a machine for treating lengthwise traveling material, the combination which comprises: a rotatably driven arcuate drive member extending continuously at least across the full width of the material to be treated, an opposed member providing a press surface that cooperates with the drive member to define a driving zone, an expansion passage at the exit end of the driving zone extending at least the full width of the material to be treated through which said material is driven from said driving zone, said expansion passage being defined on one side by a portion of the arcuate surface of said drive member, and on the other side by means defining an overlying surface spaced apart therefrom a distance greater than the minimum spacing of the surfaces defining said driving zone, and means providing a retarding passage positioned to receive material driven through said expansion passage, said retarding passage being defined by opposed surfaces spaced apart a lesser distance than the maximum spacing of the surfaces of the expansion passage to squeeze the sides of the material to apply retarding forces to the material while allowing it to extrude forwardly, the press surface and the surfaces of said expansion and retarding passages lying on the same side of the material providing continual slippable containment to said side of the material which engages them, none of the last named surfaces having longitudinal movement with respect to the other of said surfaces and at least one of the opposed surfaces defining said retarding passage being substantially stationary and defining with the opposed usrface of said retarding passage a restriction spaced beyond but in close proximity to the point of treatment which precedes the leading part of said retarding passage.

10. In a machine for treating lengthwise traveling web material comprising a driving member in the form of a roll having a length at least as long as the width of said web to be treated, said roll having a gripping surface, press means arranged to press traveling material against said gripping surface for driving said material forward, and means located forward of said press means adapted to apply retarding forces to the material, the improvement wherein said press means comprises the combination of a web-contacting member extending across the width of web to be treated, and mounted to extend from a support forwardly in order to converge relative to said driving member, and a presser member arranged to forceably contact the part of said web-contacting member substantially at the point of greatest convergence without contacting the part of said web-contacting member lying immediately rearwardly thereof, to support said web-contacting member in said converging relation to said driving member while driving forces are applied to said material, said presser member being resiliently yieldable in the direction normal to the surface of the material across the width of the material to be treated.

11. The machine of claim 10 wherein said web-contacting member is defined by a plurality of layer members of substances capable of resiliently yielding in the direction normal to the surface of the material, the layer member exposed to directly contact the material being comprised of spring metal and having a forward portion extending forwardly from the point of greatest convergence, said forward portion diverging forwardly with respect to said driving member to provide a divergent passage into which said material is driven.

12. The machine of claim 11 wherein said forward portion of said metal layer member ends at a point spaced forward of said point of maximum convergence, to provide a resiliently yieldable lip, and a second resiliently yieldable layer member extends forwardly of said lip, arranged to slippably and resiliently yieldably contact said material after it moves forwardly of said lip.

13. The machine of claim 12 wherein said retarding member is a plate member having an edge lying adjacent to said driving member and a retarding surface exposed to slippably contact the material extending forwardly from said edge, at least said second resiliently yieldable layer member converging forwardly relative to said retarding surface.

14. The machine of claim 10 wherein said web-contacting member includes a layer member of spring metal, said presser member defining a pressing edge arranged to engage said spring metal layer member substantially in a line across the width of the material to be treated, said spring metal layer member having a thickness sufficient to resist detrimental deformation by said pressing edge.

15. The machine of claim 14 wherein said spring metal layer member terminates forwardly immediately beyond said line, and a second layer member of resiliently yieldable substance lying between said first mentioned layer member and said driving member extends forwardly thereof, defining with said driving member at least part of a divergent passage, said second layer member forward of said line adapted to resiliently yield normal to the surface of the material to a greater degree than the metal layer member lying rearwardly of said line.

16. The machine of claim 10 wherein said presser member is in the form of a resiliently yieldable plate member defining an edge that extends parallel to the axis of said roll, arranged to contact said web-contacting member substantially in a line, said plate member extending rearwardly substantially tangentially to said roll from said edge to a support in the manner that said plate member edge is capable of resilient deflection in the radial direction of said roll.

17. In a machine for compressively treating lengthwise traveling material in combination, a hard generally cylindrical roll extending substantially continuously over the widthwise extent of material to be treated, mounted to rotate about its axis, and having distributed upon the generally cylindrical surface thereof a multiplicity of drive projections and indentations spaced apart in the direction the material is to be driven, an opposed member providing a press surface against which said material can slide, constructed and arranged to press said material face-wise against said roll, said projections and indentations constructed and arranged to drive material lying under said press surface without the material slipping relative to the roll, means following said press surface to cause said material to slow and compress while exposed on one side to said roll, said projections and indentations also constructed and arranged to allow the material to move outwardly from said indentations as said material slows without substantially abrading the material, said means to cause said material to slow and compress including a substantially stationary retarding member, said member having a leading part extending substantially continuously over the widthwise extent of the material to be treated, said leading part located immediately adjacent the cylindrical path of said projections, said leading part having a retarding surface extending at a substantial angle to the surface of said roll, disposed so that said material is driven against said retarding surface.

18. The machine of claim 17 wherein said retarding member leading part is mounted to contact the projections of said roll, there being a multiplicity of said projections along every line projected on said generally cylindrical roll surface parallel to said leading part, whereby, during rotation of said roll, said leading part is always in contact with said roll at a multiplicity of points.

19. A method of treating lengthwise traveling material comprising pressing the material against a moving surface to drive it forward, subjecting said material to a slippable divergent surface constraint as it is moved along by said moving surface, and immediately thereafter directing said material to move away from said moving surface at an acute angle to the direction of movement of said surface and subjecting said material to a convergent surface constraint to retard said material, imposing said convergent surface restraint by means of opposed surfaces which slippably contact the material, the surface at the side of said material which corresponds to the side on which said driving surface is located being maintained immediately adjacent said moving surface and extending substantially throughout the widthwise extent of the material for promoting disengagement of said material from said moving surface, maintaining surface constraint upon the opposite side of said material as the material disengages said moving surface, and maintaining the size and relationship of divergent and convergent constraint regions to cause incoming material to compress lengthwise against previously compressed material.

20. The method of claim 19 wherein the disengagement of said material from said moving surface is assisted by engaging the opposite side of the moving material with a stationary surface in the divergent constraint region to produce a turning moment.

References Cited by the Examiner
UNITED STATES PATENTS

| 1,565,535 | 12/1925 | Walezak | 18—2 |
| 1,806,811 | 5/1931 | Lough | 18—2 X |
| 1,808,525 | 6/1931 | Cadden | 18—2 |
| 2,032,656 | 3/1936 | Finney | 18—2 |
| 2,097,885 | 11/1937 | Koppe | 18—1 |
| 2,435,891 | 2/1948 | Lodge | 264—282 |
| 2,494,334 | 1/1950 | Dorst | 18—2 X |
| 2,628,656 | 2/1953 | Stevenson | 264—282 |
| 2,915,109 | 12/1959 | Walton | 18—9 X |
| 3,069,721 | 12/1962 | Arni et al | 18—1 |

WILLIAM J. STEPHENSON, *Primary Examiner.*

ROBERT F. WHITE, *Examiner.*

M. R. DOWLING, *Assistant Examiner.*